United States Patent [19]

Cannon et al.

[11] Patent Number: 5,725,678
[45] Date of Patent: Mar. 10, 1998

[54] AQUEOUS-BASED CLEANER FOR THE REMOVAL OF RESIDUE

[75] Inventors: Frederick S. Cannon, State College; Frederick R. Brant, Berline, both of Pa.

[73] Assignee: The Penn State Research Foundation, University Park, Pa.

[21] Appl. No.: 667,260

[22] Filed: Jun. 20, 1996

Related U.S. Application Data

[63] Continuation of Ser. No. 399,309, Mar. 6, 1995, abandoned.
[51] Int. Cl.$^6$ ............................................. B08B 3/08
[52] U.S. Cl. .................. 134/1; 134/2; 134/3; 134/22.19; 134/40
[58] Field of Search ............................ 134/6, 2–3, 22.16, 134/22.17, 22.19, 37, 40

[56] References Cited

U.S. PATENT DOCUMENTS

| | | | |
|---|---|---|---|
| 3,654,940 | 4/1972 | Ritzi | 134/2 |
| 5,013,366 | 5/1991 | Jackson et al. | 134/1 |
| 5,196,134 | 3/1993 | Jackson | 510/175 |
| 5,215,675 | 6/1993 | Wilkins et al. | 134/3 X |
| 5,269,850 | 12/1993 | Jackson | 134/2 |
| 5,302,311 | 4/1994 | Sugihara et al. | 510/175 |

*Primary Examiner*—Jill Warden
*Assistant Examiner*—Saeed Chaudhry
*Attorney, Agent, or Firm*—Thomas J. Monahan

[57] ABSTRACT

A new aqueous-based process for cleaning organic residues from industrial equipment, reactor vessels, pipelines, valves, manufactured products, industrial components, and appurtenances. The invention employs hydrogen peroxide, and can be aided by iron and/or other catalysts or enhancers. The process is used to clean glass, stainless steel, metal, ceramic, or plastic surfaces that have become soiled, coated, or sorbed with organic material from pharmaceutical, food processing, industrial, biological, or manufacturing practices, including, but not limited to, food grease, machinery grease, oils, asphalt tar, pharmaceutical tar, biological fermentation products, polysaccharides, paints, organic dyes, glues, rubber cement, xanthan gum, aliphatic materials, or aromatic materials. Said organic material that can be removed includes solid, gelatenous, or viscous materials that coat, cling, sorb, or stick to surfaces.

20 Claims, 11 Drawing Sheets

AQUEOUS-BASED CLEANER FOR THE REMOVAL OF RESIDUE

This is a continuation of application Ser. No. 08/399,309 filed on Mar. 06, 1995, now abandoned.

BACKGROUND OF THE INVENTION

The present invention relates to a new aqueous-based method for removal of organic wastes or residues from industrial equipment or components.

By way of background, cleaning operations for reaction vessels generate a major source of hazardous waste at many pharmaceutical, fine chemical, and manufacturing industries. Moreover, cleaning requires much time and labor, particularly for batch operations where the product varies from one campaign to the next. Some of the most difficult residues to clean include tars, resinous-like deposits, and organic stains that are coated or baked onto reactor walls following crystallization or drying steps. Traditionally, many industries have employed acetone, methanol, toluene or other organic solvents to dissolve and remove these residues. However, both industry and the EPA aggressively seek means of eliminating solvents, because they must be disposed of as toxic and hazardous wastes, causing considerable expense, paperwork, and liability. When an aqueous-based hydrogen peroxide/detergent procedure replaces organic cleaning solvents, this creates a major impact industry-wide, and offers a tremendous opportunity toward achieving environmentally benign manufacturing.

Many industries are proactively seeking waste minimizing cleaning measures, and several have therefore either adopted or contemplated the use of alkaline and acidic detergents. These could be used in concert with water jets. The extreme pH's of these alkaline and acidic detergent systems are designed to capitalize on formal charges within the organic residue, so that surfactants and chelating agents can carry the charged residue off of the reactor walls and solubilize the residue into the aqueous phase. Such charge can appear, for example, in carboxyl ($RCOO^-$) groups that appear within the residue.

This approach of employing acidic or alkaline detergents alone has proved efficient in some, but not all, cleaning applications, and the inventors have shown that a vigorous oxidation, or pre-oxidation step could improve performance. For many cases, the oxidation step alone is suitable in removing residues from surfaces in an aqueous environment. The most tenacious residues often include tars, greases, and resinous materials. Organic residues that have been enhanced in their quantity of charged functional groups would be expected to exhibit more solubility in a polar aqueous environment.

Hydrogen peroxide, and the hydroxyl radicals that they can generate, can aggressively attack organic compounds and create oxygen-containing functional groups within organic matter (G. Strukul, ed., *Catalytic Oxidations with Hydrogen Peroxide as Oxidant*, Kluwer Academic Publishers, Boston, Mass. 1992). This process can be enhanced by catalysts. Reaction mechanisms such as the following (Brant, F. R. and Cannon, F. S., *Aqueous-Based Cleaner Enhancement by Hydrogen Peroxide*, American Chemical Society Proceedings, Hazardous Materials Control Symposium, Atlanta, Ga., September 1994) have been suggested:

$$HOOH \rightarrow OH \cdot + OH^-$$

$$OH \cdot + RH \rightarrow R \cdot + H_2O$$

$$R \cdot + O_2 \rightarrow RO_2 \cdot ;$$

$$RCO_2 \cdot + HO_2 \cdot \rightarrow RCOOH + O_2$$

$$RCOOH + OH^- \leftrightarrows RCOO^- + H_2O$$

Other mechanisms could also operate. It has been proposed that the charge of the $RCOO^-$ (carboxyl) groups could enhance the solubilization of residues into the aqueous phase, and therefore enhance the cleaning action of detergent systems.

Carboxyls deprotonate to the charged $RCOO^-$ form at typical pH values of 4–6, and hydroxyls deprotonate to the charged $RO^-$ form at typical pH values of 9 to 10 (Chemical Rubber Company, Handbook of Chemistry and Physics, 1994). Thus, the subsequent alkaline detergents would not need to operate at the extreme (and "hazardous") pH's exceeding 12.5, which might otherwise be recommended by detergent suppliers. This moderation also offers the potential of prolonging the life of glass or metal surfaces and eliminate regulatory paperwork.

Hydrogen peroxide is becoming an increasingly favorable oxidant in industry, and its production is expected to increase significantly during the next decade. This growth in popularity has arisen because companies quest to practice pollution prevention and employ environmentally benign chemicals. Hydrogen peroxide offers an unique feature among oxidants in that its byproducts are merely water and oxygen.

Hydrogen peroxide has become employed as a non-selective oxidant for bleaching cloths (U.S. Pat. No. 5,002,682), cellulose, and textiles; for disinfecting contact lenses (U.S. Pat. No. 5,362,444), skin, water, milk, and fruit juices; for manufacturing organic chemicals; for preparing semi-conductor surfaces (U.S. Pat. No. 5,302,311); for removing flux residue (U.S. Pat. No. 5,196,134), and for treating contaminated water (U.S. Pat. No. 5,266,214).

The pharmaceutical and fine chemical industry employs hydrogen peroxide to create epoxides, replace hydroxyl groups for double bonds, substitute hydroxyl groups onto aromatic rings, and break aromatic ring structures by acquiring carboxyl groups. Hydrogen peroxide can also convert ketones to carboxylic acids, and quinones to hydroquinones.

It is noted that in these cases, the product is more oxidized than the reactant, and in many of these cases, the product contains hydroxyl or carboxyl groups that allow the product to be more soluble in water than the reactant. Indeed, quinones and hydroquinones can be commercially separated from one another by segregating them into non-polar and polar solvents, respectively.

It has been proposed that hydrogen peroxide generates the hydroxyl radical (HO.) when it interacts with such catalysts as iron, copper, manganese, titanium dioxide, or titanium; or when it interacts with light that contains an ultraviolet component. This hydroxyl radical can in turn aggressively oxidize and oxygenate organic compounds. This feature has the potential of greatly enhancing the cleaning process for industries. Iron catalysis (H. J. H. Fenton, *J. Chem. Soc.*, 65, 899 [1894]) has been characterized by the expressions:

$$Fe^{2+} + HOOH = Fe^{3+} + OH^- + HO \cdot$$

$$HOOH + HO \cdot = H_2O + HOO \cdot$$

$$Fe^{3+} + HOO \cdot = Fe^{2+} + H^+ + O_2$$

Other mechanisms that involve $Fe^{+3}$ as the catalyst also could operate. Once the hydroxyl radical is formed, it can rapidly react with organic compounds, often to form more highly oxygenated products.

SUMMARY OF THE INVENTION

In accordance with the present invention, hydrogen peroxide can be used to facilitate the cleaning of reactor vessels, pipelines, valves, and appurtenances. This cleaning enhancement can be aided by iron and/or other catalysts or enhancers. The process can be used to clean glass, stainless steel, metal, or plastic surfaces that have become soiled, coated, or sorbed with organic material from pharmaceutical, food processing, industrial, biological, or manufacturing practices, including food grease, machinery grease, oils, asphalt tar, pharmaceutical tar, biological fermentation products, glues, xanthan gum, sludges, paints, rubber cement, dyes, polysaccharides, aliphatic materials, aromatic materials, viscous material, solid material, sorbed material, and the like.

By use of the present invention, industrial equipment, reactor vessels, pipes, valves, manufactured components, or appurtenances that have become soiled, coated, or sorbed with the above materials, can become cleaned, or encounter enhanced cleaning by applying to them an aqueous-phase hydrogen peroxide solution, with hydrogen peroxide concentrations in the 0.5 to 30% range, and most preferably in the 2 to 10% range. This cleaning or cleaning enhancement can be aided by maintaining the hydrogen peroxide solution at a pH of 0.0 to 14.0, and more preferably between 2 and 12.5, and most preferably between 7 and 10.5. Further, we have found that this cleaning enhancement is aided by the presence of catalysts or enhancers, such as iron in the form of ferric or ferrous salts, where the anion in the salt could be chloride, sulfate, carbonate, negatively charged organic compounds, or another anion. The iron could become a dissolved species, or it could be an immobilized species that is held in a solid phase. Other helpful catalysts and enhancers include copper, titanium dioxide, titania, manganese, heavy metals, electrical current, ozone, ultra-violet light, and other radical-inducing means.

The hydrogen peroxide solution, along with its catalysts or enhancers, can be applied to the surfaces by either soaking the surfaces in the aforementioned solution, or by spraying the aforementioned solution as a pressurized fluid against the surface. Under the spraying configuration, the pressures could be 0.1 to 100,000 pounds per square inch gage (psig), and preferably 1 to 40,000 psig.

The aforementioned hydrogen peroxide solution could either serve as the primary cleaning procedure, or it could serve as a preconditioning step that is followed by subsequently exposing the surfaces to an aqueous-based cleaning step or a solvent-based cleaning/polishing step. For some of the soil material that the inventors have tested, the aforementioned solution effectively removes all of the soil materials from the surfaces. In other cases, the aforementioned hydrogen peroxide solution preconditions the soil material in such a manner that the subsequent cleaning step is more effective than it would have been if the hydrogen peroxide exposure had been bypassed.

Aqueous-based cleaning steps that follow hydrogen peroxide preconditioning could include alkaline or acidic cleaning solutions that contain surfactants. These solutions could have a pH of 0.0 to 14, and more preferably 2 to 12.5 and most preferably pH 7 to 10.5. One of the potential roles of the hydrogen peroxide solution, as a preconditioner, is to render the soil material more hydrophilic so that it can be removed more readily from the soiled surface in an aqueous-based or charged environment. Solvent-based cleaning steps that follow hydrogen peroxide preconditioning could include, but not be limited to, acetone, methanol, toluene, xylene, acetic acid, tartaric acid, and other organic solvents. The value of the hydrogen peroxide solution as a preconditioning step in these cases is to remove the bulk of the soil material, so that the following solvent step serves merely as a polishing procedure to remove the final residual soil material. By this sequential operation, then, the solvent can be preserved and recycled without excessive contamination from the soil material.

The surfaces that could be cleaned by the aforementioned invention could include glass, stainless steel, plastic, metal, and ceramic surfaces.

The soil material could include, but not be limited to, material from pharmaceutical, food processing, industrial, biological, or manufacturing practices, including, but not limited to, food grease, machinery grease, oils, asphalt tar, dyes, glues, pharmaceutical tar, biological fermentation products, polysaccharides, paints, rubber cement, aliphatic materials, or aromatic materials.

In order to simulate residue clinging conditions that the pharmaceutical and fine chemical industries, manufacturers, and other industries might experience, asphalt tar, food grease, axle grease, xanthan gum, biological sludges, paints, dyes, rubber cement, and glues were employed as surrogate compounds. These surrogates represented several classes of the more tenacious and water-insoluble compounds that might be experienced in these industries. Asphalt roofing tars, for example, are specifically designed to adhere to roofs and to shed water.

The following examples are offered to illustrate particular embodiments of the invention, but are not intended to be limitative thereof otherwise noted, all percent HOOH concentrations are given as percent by weight.

EXAMPLE 1

Asphalt Tar on Glass Surfaces

Figure 1:
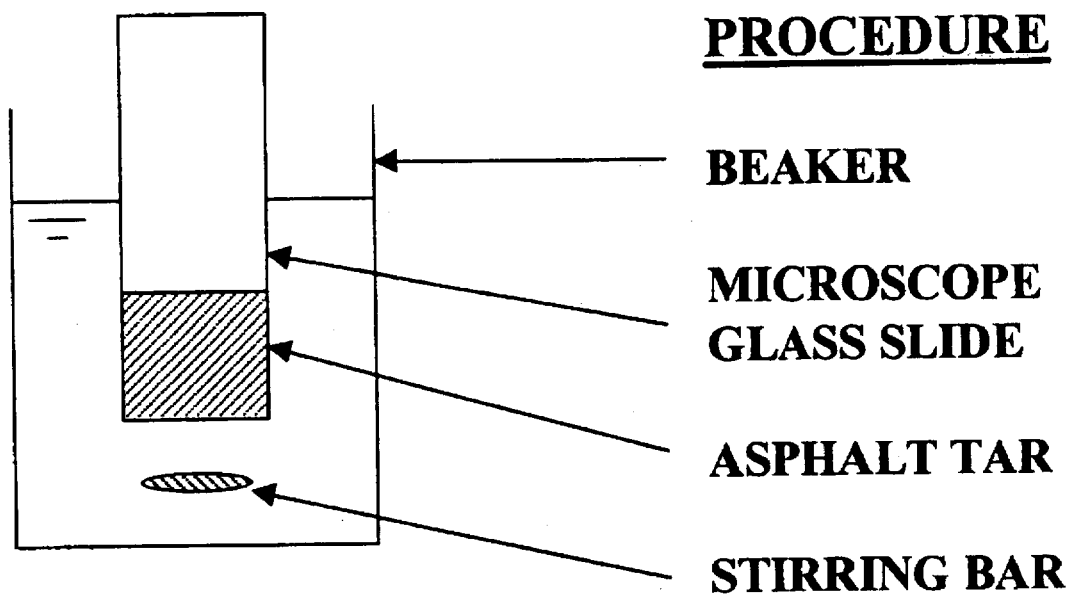
FIG. 1 is a cleaning procedure schematic.

Asphalt Tar. Controlled laboratory experiments employed asphalt roofing tar. Tar was coated onto 1-inch by 2-inch areas of glass microscope slides. A toothbrush applied the tar, and the (dry) mass that was applied typically amounted to 0.10 to 0.15 grams. The portion of the microscope slide that had received a tar coating was immediately weighed, and then immediately and completely submerged within 250 ml of a hydrogen peroxide solution. A stirring bar mildly mixed the HOOH solution throughout the 15 to 105 minute soaking cycle, and the solution was contained within a glass beaker (FIG. 1). After soaking, the slides were raised out of the HOOH solution, mildly rinsed in tap water, air-dried for 12 hours, and then weighed to obtain their dry mass and determine the percent of tar remaining. Percent tar remaining equaled the final dry mass divided by the initial wet mass multiplied by 100. Duplicate experiments were generally conducted, and the two duplicates were usually within 25% of each other (for example: 20% and 45% remaining). For other surrogate organic residues, a similar procedure was employed, except as otherwise noted.

Unless otherwise identified below, 3% HOOH was employed. This was diluted from a 25 to 30% stock solution whose concentration was frequently monitored by means of a sodium thiosulfate titration method. The HOOH solution contained no stabilizers such as phosphates, unless otherwise listed below. NaOH was employed to adjust pH, and $10^{-3}$M $FeCl_3$ served as the source of iron, unless otherwise indicated.

A mass spectrometer analysis of the untreated tar revealed that its volatile fraction contained a wide array of molecular weights, from 30 to 600 Daltons. After treatment with HOOH, the solubilized tar also displayed a wide array of molecular weights, from 30 to 475 Daltons. Tests were conducted using an electron impact magnetic sector mass spectrometer with an impact energy of 70 eV.

Air-Drying.. Air-drying of the wet asphalt tar alone left 76 to 83 percent of the initial wet mass of tar remaining. Thus 17 to 24% of the tar's wet mass was comprised of volatile compounds that dissipated into the air during 12 hours of drying.

Figure 2:
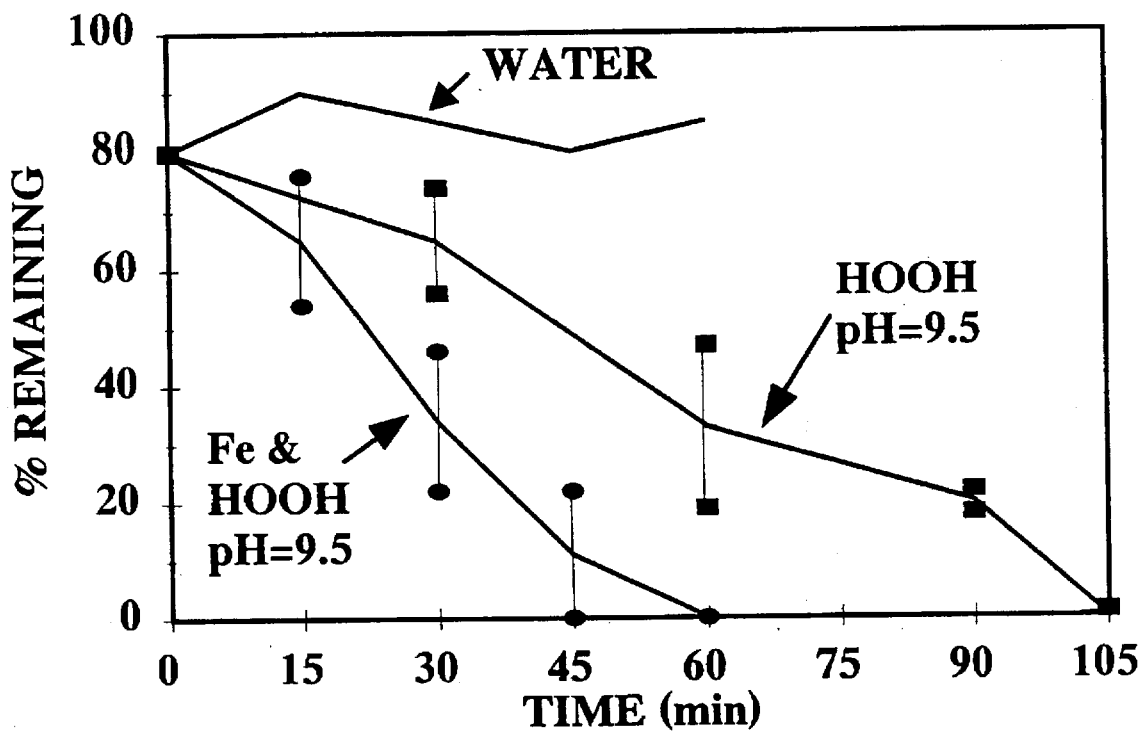
FIG. 2 is the effect of soaking time on the mass percent asphalt tar remaining when tar is exposed to (a) distilled water, (b) 3% hydrogen peroxide at pH 9.5, and (c) $10^{-3}$M $FeCl_3$ and 3% hydrogen peroxide at pH 9.5.

Distilled Water. The tar-coated slides were immersed in distilled water for times of 15 to 60 minutes. After subsequent air-drying for 12 hours, 79 to 91 percent of the tar mass remained, as shown in FIG. 2. This represented no more tar loss than could be achieved by merely air-drying the tar without soaking it in water. Thus, no gravimetrically significant mass of the asphalt tar was dissolved into the water, and water alone offered no value for cleaning asphalt tar from glass surfaces.

3% HOOH, pH 9.5. When the tar-coated slides were immersed in a 3% HOOH solution at a pH of 9.5, 100% of the asphalt was removed from the glass surface within 105 minutes (FIG. 2). For the time intervals preceding this, the percent tar removal correlated somewhat linearly with time. The tar removal process appeared somewhat like a dissolving mechanism, where first the tar layer became solubilized in pin-point areas that left a clear patch on the glass surface. With time, these clear patches grew wider until eventually the whole glass surface was clear. Apparently, the HOOH most aggressively attacked the perimeter of these clear areas.

3% HOOH, pH 9.5, $FeCl_3$. When $10_{-3}$M $FeCl_3$ was included with 43% HOOH at pH 9.5, all of the asphalt tar could be removed within 45 to 60 minutes (FIG. 2). The $Fe^{+3}$ appeared to participate in the Fenton reaction or some other mechanism, and caused the cleaning reaction to roughly double its rate.

Figure 3:
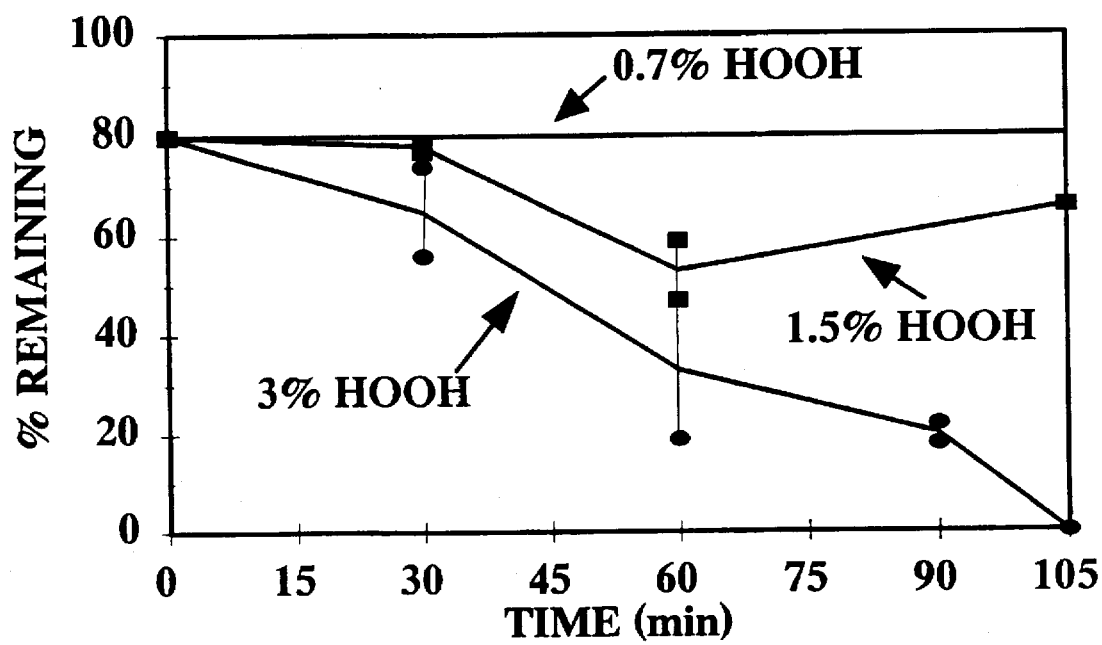
FIG. 3 is the effect of HOOH concentration on asphalt tar removal; at pH 9.5 with no iron.

Variable HOOH Concentration. Three concentrations of HOOH were tested, as shown in FIG. 3. These tests revealed that an 0.7% HOOH solution provided no greater removal of tar mass than did mere air-drying. A 1.5% HOOH solution caused some dissolution of the tar, but not as much as was achieved by a 3% HOOH solution (FIG. 3).

Figure 4:
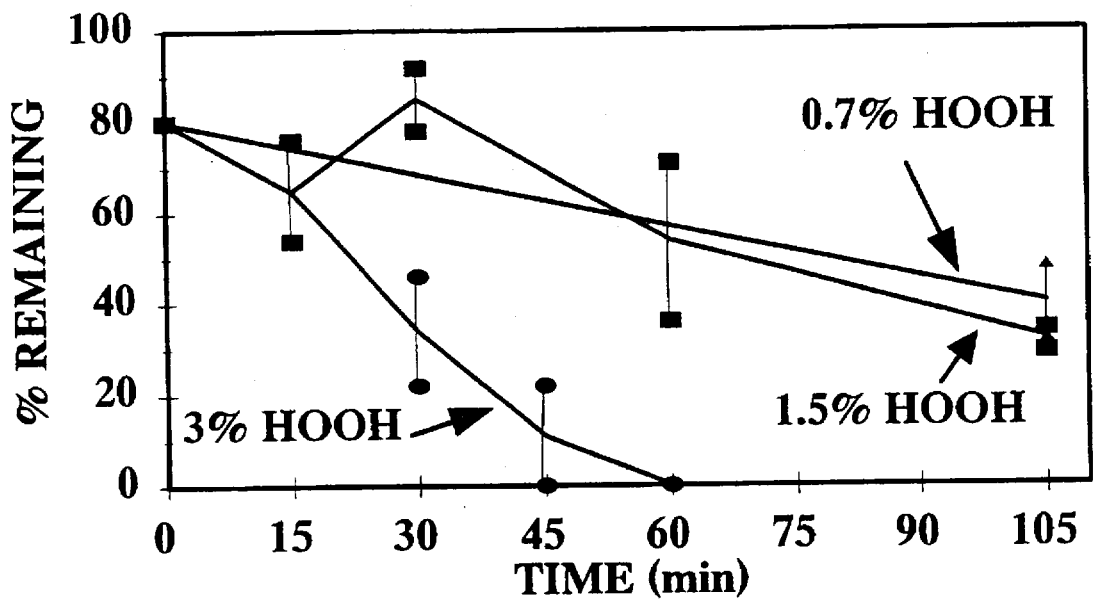
FIG. 4 is the effect of HOOH concentration on asphalt tar removal; at pH 9.5 with $10^{-3}$M $FeCl_3$.

These same three HOOH concentrations were also tested in the presence of $10^{-3}FeCl_3$. The 0.7% and 1.5% HOOH conditions behaved somewhat similarly, with 30 to 50% of the tar remaining for both concentrations after 105 minutes of soaking. This was a considerably higher amount of tar remaining than when 3% HOOH and $10^{-3}$M $FeCl_3$ was employed. Moreover, the 1.5% HOOH and $10^{-3}$M $FeCl_3$ solution was less effective at removing tar (FIG. 4) than was the 3% HOOH solution that contained no iron (compare to FIG. 3).

Figure 5:
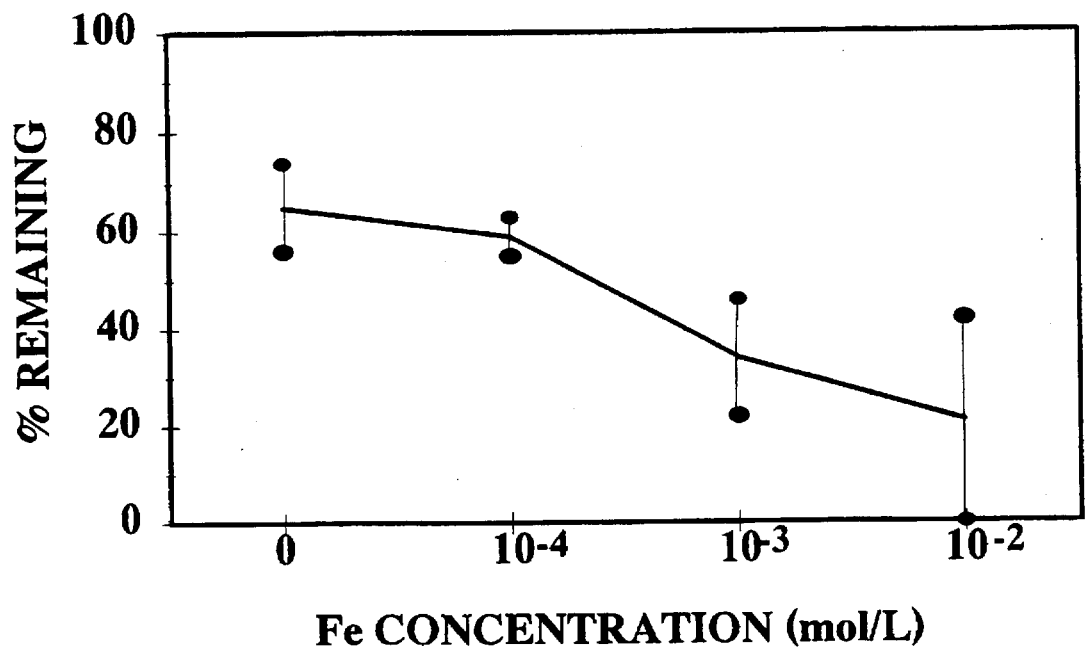
FIG. 5 is the effect of $FeCl_3$ concentration on asphalt tar removal; 30 minutes soaking in 3% hydrogen peroxide, pH 9.5.

Influence of $FeCl_3$ Concentration. Tests evaluated how the $FeCl_3$ concentration influenced the extent to which tar could be removed from glass slides. These tests employed a 30 minute soaking time at pH 9.5. While the iron concentration ranged from 0 to $10^{-2}$M $FeCl_3$, it was found that the percent tar remaining ranged from 55–75% down to 0–40%, respectively (FIG. 5). A $10^{-4}$M $FeCl_3$ solution improved tar removal very little over what could be achieved with no iron added. The $10^{-2}$M $FeCl_3$ improved removal slightly over that which could be achieved with a $10^{-3}$M $FeCl_3$ concentration.

On a mass balance basis of comparison, when $10^{-3}$M $FeCl_3$ and 3% HOOH were mixed in 250 mL solution with a microscope slide that was coated with 0.10 to 0.15 g (dry mass) of tar, the beaker contained three orders of magnitude more moles of HOOH than it did moles of $Fe^{+3}$, and there were roughly 20 to 60 moles of HOOH present for every mole of carbon within the tar's chemical structure.

Figure 6:
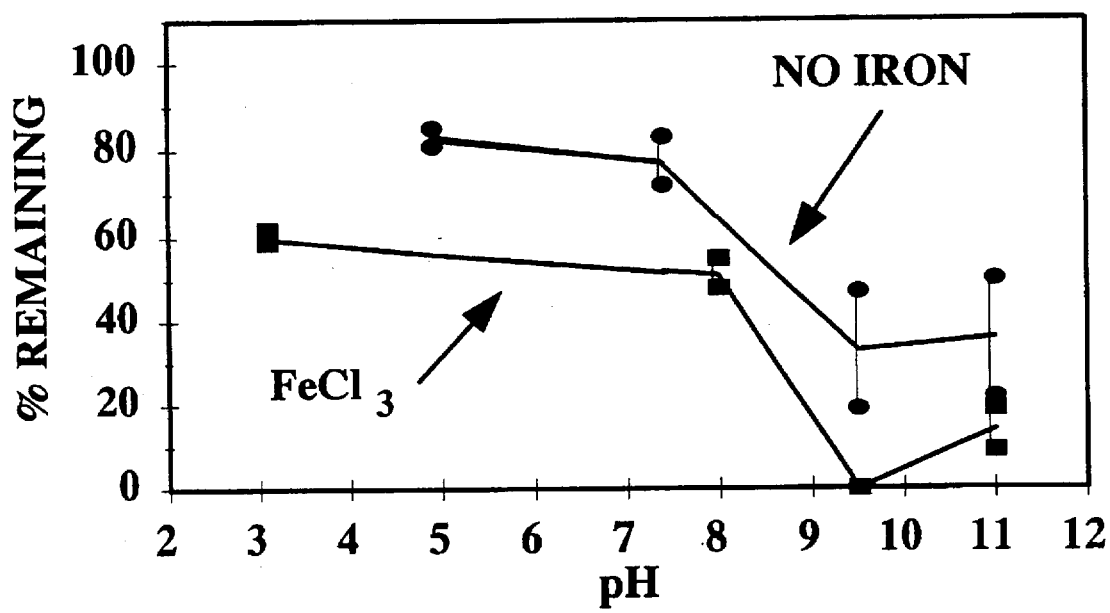
FIG. 6 is the effect of pH on tar removal for a solution of 3% hydrogen peroxide (a) alone and (b) with $10^{-3}$M $FeCl_3$; 1 hour soaking time.
Figure 7:
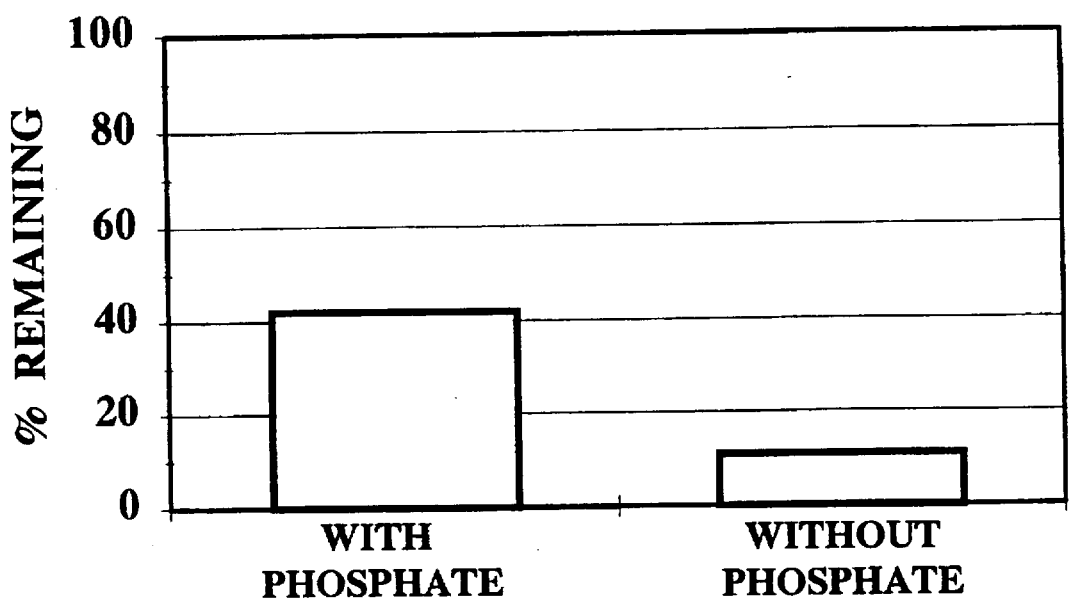
FIG. 7 is the effect of phosphate stabilizers on tar removal; 30 minutes soaking in 3% hydrogen peroxide with $10^{-3}$M $FeCl_3$.

Influence of pH. The most favorable pH for tar removal occurred at a pH of 9.5, as identified in FIG. 6. This was observed both with and without iron. Without iron, only 19 to 47% of the tar remained after an hour of soaking at pH 9.5, whereas 22 to 50% remained at pH 11. Thus, no more removal was achieved at pH 11 than at pH 9.5, and the additional chemical cost to increase the pH above 9.5 would have provided no improved performance. At a pH of 4.9 or 7.4, as much tar mass remained after one hour of soaking in 3% HOOH as remained if the wet tar were merely air-dried (Compare to FIG. 1). Thus, an elevated pH was necessary for the HOOH to effectively dissolve the tar.

Similarly, when $10^{-3}$M $FeCl_3$ was included with 3% hydrogen peroxide, none of the tar remained at a pH of 9.5. In contrast, 9 to 19% remained at a pH of 11, and 48 to 55% remained at a pH of 8. Thus, raising the pH to 9.5 achieved the most removal, and further raising the pH to 11 caused a slight loss of performance.

These are encouraging results, since a pH of 9.5 represents a fairly mild and non-hazardous pH condition. If a pH condition exceeded 12.5, regulations would classify the solution as a hazardous waste. Moreover, pH conditions exceeding the range of 11 or 12 might slowly etch glass surfaces.

Influence of Stabilizers. Stabilizers such as phosphates usually become added to HOOH solutions that are sold to consumers in the grocery store or drug store, because they prevent the HOOH from degrading while it is stored on the shelf, and they help control vigorous reactions with iron products.

These stabilizers significantly hindered tar removal, as revealed when the tar was immersed for 30 minutes in 3% HOOH and $10^{-3}$M $FeCl_3$. When 3% grocery store HOOH solution included stabilizers, 41% of the tar remained (FIG.

7). This compared to 10% remaining when reagent grade HOOH was employed and the stabilizer was excluded.

Figure 8:
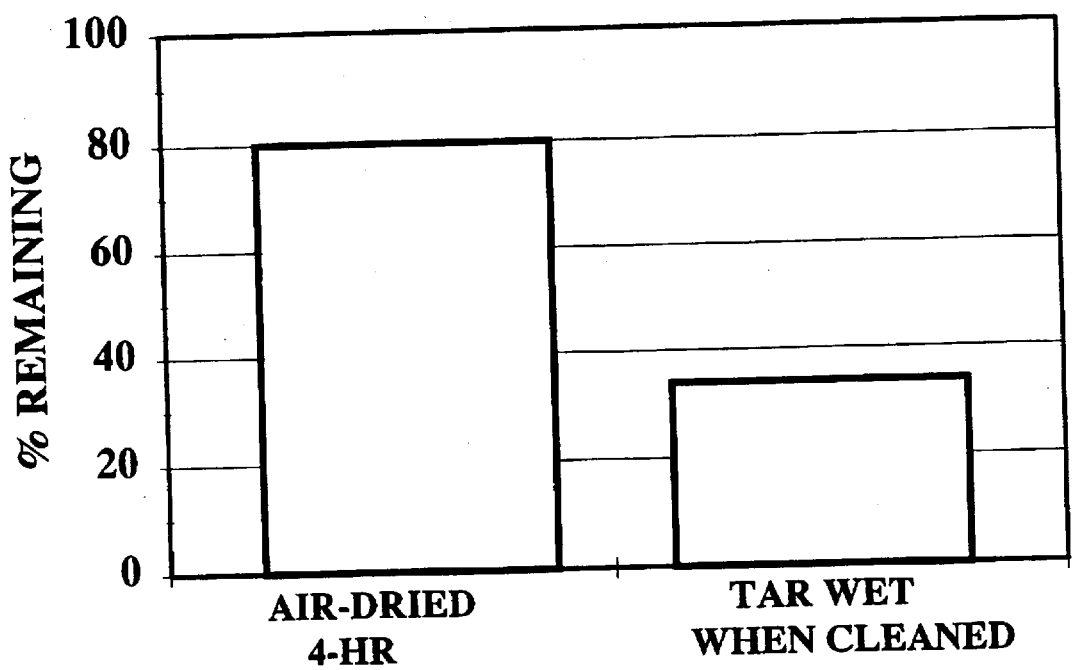
FIG. 8 is the influence of asphalt drying time in air before treatment with 3% hydrogen peroxide and $10^{-3}$M $FeCl_3$; minutes soaking.

Influence of Asphalt Pre-Drying in Air. As a uniform procedure in all of the experiments that have been discussed above, the glass slides were always immersed in HOOH solution immediately after becoming coated with tar. Tests evaluated the effect of delaying this immersion by letting the tar first dry in air for several hours. These tests employed 3% HOOH and $10^{-3}$M $FeCl_3$ for 30 minutes. When immediately immersed, only 35% of the tar remained after the soaking step (FIG. 8). In contrast, when the slides were air-dried for four hours before they were immersed in this solution, 80% of the wet mass of the tar remained after 30 minutes of soaking. Thus, the HOOH treatment of dried tar achieved no further removal than mere air-drying had accomplished, and pre-drying allowed the tar to become resistant to the HOOH cleaning action.

Figure 9:
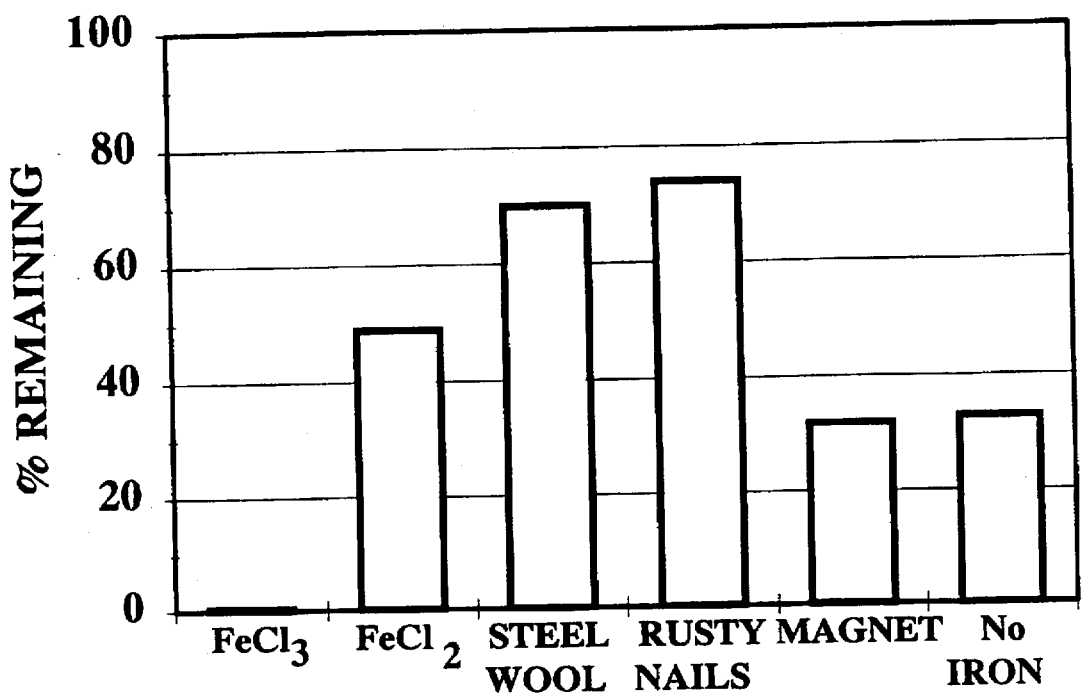
FIG. 9 is a test for various sources of iron as catalyst; 3% hydrogen peroxide solution, pH=9.5, 1 hour soaking.

Tests of Various Sources of Iron as Catalyst. Pursuant to the findings that $FeCl_3$ could double the tar removal rate, the inventors searched for other iron sources that could serve as catalysts. Four alternative sources of iron were tested, including $FeCl_2$, refrigerator magnets, steel wool, and rusty nails (FIG. 9). These tests were conducted at a pH of 9.5, with one-hour of soaking in 3% HOOH plus the source of iron.

With the $FeCl_3$, none of the tar remained after one hour of soaking, compared to 50% remaining with $FeCl_2$, 70% remaining with steel wool, 75% remaining with rusty nails, and 30% remaining with a refrigerator magnet, and 30% remaining with no magnets.

Figure 10:
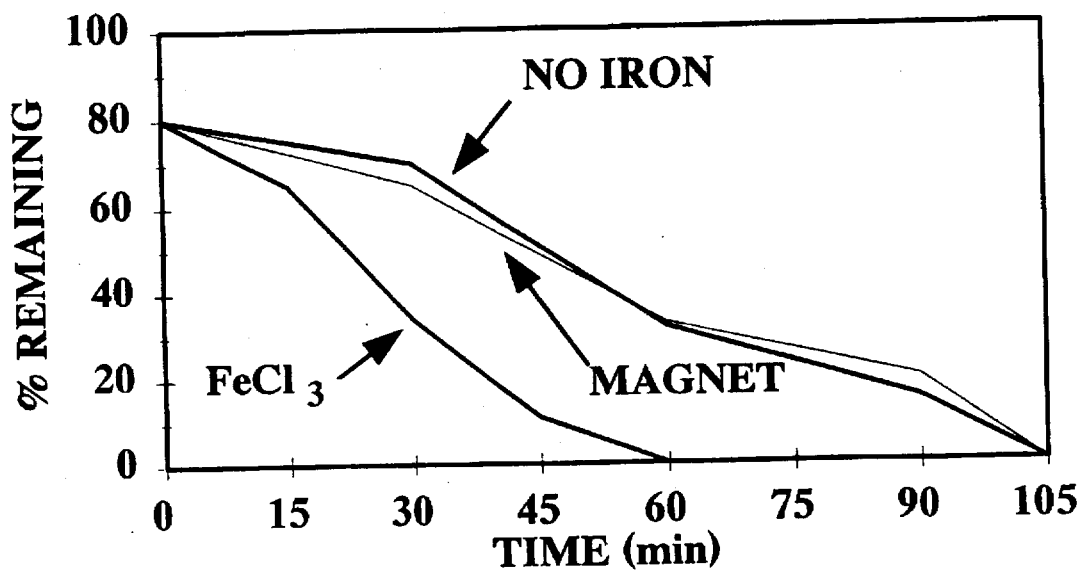
FIG. 10 is a test for magnet as catalyst; 3% HOOH, pH 9.5.

Additional tests for various time durations were also conducted with the refrigerator magnets, as shown in FIG. 10. These tests employed 3% HOOH at a pH of 9.5, and revealed that the magnets caused no greater tar removal than if the magnets had been excluded. The magnets consisted of magnetic iron that had been immobilized within a flexible plastic matrix. These were the same type of magnets that would commonly be used to affix a post-it note to the refrigerator. The magnets were ⅛-inch thick and each experiment employed a ½-inch by 4-inch strip that was replaced every 10 minutes.

Figure 11:
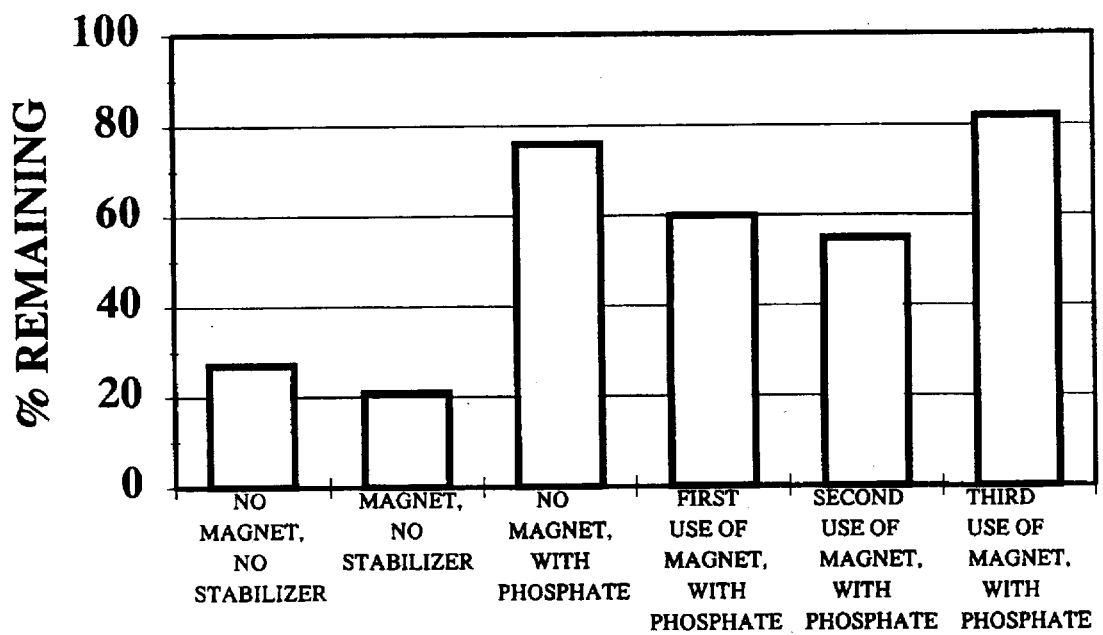
FIG. 11 is the influence of magnet on HOOH solution that contains phosphate stabilizers. Percent tar remaining on beaker surface after 1 hour soaking; pH 9.5 and buffered by NaOH.

It was found that refrigerator magnets favorably influenced tar removal performance when the HOOH contained stabilizers, such as phosphates, as shown in FIG. 11. This became apparent during tests in which asphalt tar was coated directly onto the inner walls of 400 mL glass beakers. These beakers were soaked for an hour in 3% HOOH that contained stabilizers. The solution was buffered to pH 9.5 with NaOH. Following the soaking cycle, the beakers were gently rinsed in distilled water, air dried, and then weighed.

When no magnets were included, 76% of the tar remained following soaking in stabilized HOOH. This was only slightly better than the 84% that remained if the beakers had merely been soaked in distilled water. However, if a ⅛"×½"×4" magnet strip was placed into the beaker for the full 1-hour duration, only 60% of the tar remained on the walls of the beaker. When this same magnet strip was then placed in a second tar-coated beaker, 55% of the tar remained after an hour. If the same strip was then placed in yet a third beaker, 82% of the tar remained after one-hour soaking. In contrast, when no stabilizer was included in a 3% reagent-grade HOOH solution, only 21 to 27% of the tar remained after an hour of soaking, regardless of whether the magnet was included.

Thus, the magnets apparently passivated the ability of phosphate to serve as a stabilizer. It is proposed that the phosphate stabilizers, with their multivalent negative charge, were electrostatically attracted to the magnets. This effect may have physically displaced the phosphate from the tar surface and therefore rendered it unavailable to scavenge the reactive radicals that hydrogen peroxide generated. Other mechanisms may also have played a role.

Industries could capitalize on this phenomenon at full scale: They could store their HOOH with a phosphate stabilizer included, allowing for a longer and safer shelf life. Then, when the HOOH is utilized, they could glean the HOOH's full oxidative and cleaning capacity by electrostatically segregating the phosphate with magnets.

EXAMPLE 2

Asphalt Tar on Stainless Steel

Several 1-inch by 3-inch by 1/16-inch thick stainless steel slides were coated with asphalt tar, with experimental procedures conducted the stone as for the Example 1 conditions. The slides, coated with asphalt tar, were immersed into the test solution immediately after the slides had been coated with asphalt tar. Results revealed that after two hours of soaking in a 3% hydrogen peroxide solution for two hours at a pH of 9.5, only 57% of the tar remained. Moreover, if the soaking solution contained both 3% hydrogen peroxide plus $10^{-3}$M $FeCl_3$ at a pH of 9.5, only 18% of the asphalt tar remained after two hours of immersion. In contrast, if instead, the asphalt tar-coated slide was immersed in mere distilled water, 78% of the original wet mass of the asphalt tar remained after two hours. These experiments were designed to highlight the distinctions between the various immersion conditions. As with the tests in Example 1, longer times could be expected to remove all of the tar.

EXAMPLE 3

Food Grease and Axle Grease

Food Grease and Axle Grease. Both food grease and axle grease were coated on glass slides. The food grease was baked onto slides for 24 hours at 105° C. The baking step was not included for experiments that employed axle grease. After 60 minutes of gentle mixing in a 3% hydrogen peroxide and $10^{-3}$M $FeCl_3$ solution (pH 9.5), 0% of the food grease remained on the glass surface. In comparison, 42% of the food grease remained on slides that had been mixed in distilled water alone.

All of the axle grease was removed (i.e. 0% remaining) for slides that were immersed for 60 minutes in 3% hydrogen peroxide solution at pH 9.5 that contained $10^{-3}$M $FeCl_3$. This compares to 98% of the axle grease remaining on slides after mere immersion in distilled water for 60 minutes.

Another array of grease experiments employed clean glass beakers and post-treatment with alkaline cleaning detergents. For these food grease experiments, clean glass beakers were coated with a residue of grease, and then baked at 105° C. for more than twenty-four hours. Axle grease experiments excluded the baking step. Next, the beakers were soaked for sixty minutes in either (a) distilled water, (b) hydrogen peroxide alone, or (c) hydrogen peroxide that had been buffered to a pH of 9.5 with sodium carbonate. No cleaning behavior difference was observed between $Na_2CO_3$ and NaOH when they were used to adjust pH. Ferric chloride was also employed in some of these experiments.

Next, the beakers were emptied of the preconditioning HOOH solution, and then filled with an alkaline detergent solution and moderately mixed for sixty minutes. The beakers were then emptied and mildly rinsed with a steady stream of distilled water, and then dried. The final extent of grease removal was then visually observed.

Both food grease and axle grease incurred enhanced removal when a 3% HOOH soaking preceded one-hour mild mixing in aqueous-based alkaline cleaning detergents. Without HOOH, the alkaline cleaner could remove only roughly a third of the food grease from the glass beaker walls. But with an hour preconditioning of stabilized HOOH at pH 9.5, approximately 95% of the food grease was removed during alkaline detergent cleaning. $FeCl_3$ added to the HOOH also enhanced detergent cleaning, allowing approximately 95% removal. Mild mixing conditions and short times were intentionally selected in these experiments in order to highlight the distinctions between HOOH use and non-use. Complete grease removal could be expected under more aggressive HOOH mixing conditions and longer durations, as discussed in Example 1 above.

Less than half of the axle grease could be dislodged from beaker walls when it was cleaned merely with alkaline cleaners for 60 minutes. However, when preceded with 3% stabilized HOOH plus $FeCl_3$ at pH 9.5, the alkaline cleaner removed more than 90% of the axle grease. More favorable HOOH conditions and longer durations could be expected to remove all of this grease. As in the above experiments, mild mixing conditions and short times were intentionally selected in these experiments in order to highlight the distinctions between HOOH use and non-use. Complete grease removal could be expected under more aggressive HOOH mixing conditions and longer durations.

EXAMPLE 4

Xanthan Gum

A mixture of Xanthan gum and water was coated onto glass slides in accordance with the procedure of Example 1. The Xanthan gum was provided by Merck Co. Xanthan gum is a high-molecular weight viscous polysaccharide that represents the type of polysaccharide residual materials that can be found on reactor vessel walls following biological fermentation process manufacturing. Prior to immersing the xanthan gum-coated slides in the cleaning solution, the slides were dried in air for 12 hours. They were then immersed in either distilled water or in a hydrogen peroxide solution. In mere distilled water, a full 60 minutes immersion was required to remove 100% of the xanthan gum from the glass slide surface. However, when the cleaning solution contained 3% hydrogen peroxide at a pH of 9.5, the soaking time for 100% removal was reduced to 30 minutes. Following 5 minutes of immersion in the 3% hydrogen peroxide, 12% of the original xanthan gum mass remained; within 10 minutes, 9.6% remained; within 15 minutes, 4.9% remained; within 25 minutes, 0.8% remained, and within 30 minutes, 0% remained.

EXAMPLE 5

Biological Sludges

Tests evaluated whether hydrogen peroxide effectively removed residuals of thickened sludge that had originated from a wastewater treatment plant. Such sludges contain high compositions of partially decomposed biological matter including phospholipids; they also include clays and inorganic precipitates. This sludge also represents the types of biological residue that remains on reactor vessel walls following biological fermentation manufacturing processes. This thickened sludge was coated onto glass slides, and then air dried for 10 hours prior to immersion. When the cleaning solution contained 3% hydrogen peroxide and $10^{-3}M$ $FeCl_3$ at a pH 9.5, there was 0% of the sludge mass that remained following 35 minutes immersion time. In contrast, when the slides were immersed in mere distilled water, a full 38% of the sludge mass remained following a full 60 minutes of immersion.

EXAMPLE 6

Paints

Hydrogen peroxide cleaning was tested for several paint formulas, including latex paints, acrylic paints, alkyd paints, and epoxy paints. All of these tests employed experimental procedures similar to those for Example 1, whereby a thin layer of paint was applied to a glass or stainless steel slide, the paint was allowed to air-dry on the slide for pre-arranged durations, and then the paint-coated slide was immersed in cleaning solutions that were mixed at a gentle rate.

In experiments with latex paint, the paint was allowed to dry on the glass slide for 10 hours before immersion. A 100% removal of the paint was accomplished within 20 minutes of immersion in a cleaning solution that contained 3% hydrogen peroxide and $10^{-3}M$ $FeCl_3$ at a pH of 9.5. In contrast, immersion in mere distilled water required a full 35 minutes immersion in order to remove 100% of the latex paint mass from the glass slide surface.

In experiments with acrylic paint, the paint was allowed to dry on the glass slide for 10 hours before immersion. A 100% removal of the paint was accomplished within 13 minutes of immersion in a cleaning solution that contained 3% hydrogen peroxide and $10^{-3}M$ $FeCl_3$ at a pH of 9.5. In contrast, immersion in mere distilled water required a full 20 minutes immersion in order to remove 100% of the acrylic paint mass from the glass slide surface.

An alkyd paint was coated onto glass slides, and then air dried for 5 minutes before immersion. When immersed in a cleaning solution that contained 3% hydrogen peroxide and $10^{-3}M$ $FeCl_3$ at a pH of 9.5, all but 2% of the paint mass was removed within 60 minutes of immersion. Longer times could be expected to remove the balance of the residual, as per the trends revealed in Example 1. In contrast, when the alkyd paint-coated slides were immersed in distilled water, a full 70% of the original paint mass still remained on the glass slide surface after 60 minutes of immersion.

Clean glass slides were weighed and then coated with an epoxy paint. After air drying for 5 minutes, the new coated weight was recorded. Next, the slides were mixed for 60 minutes in either distilled water or 3% hydrogen peroxide plus $10^{-3}M$ $FeCl_3$ at pH 9.5 followed by rinsing with a high velocity stream of water. When the slides had air dried for 24 hours, they were weighed again. The slides that had been immersed in the hydrogen peroxide solution retained only 3% of the epoxy mass after a moderate velocity water jet spray that was created by the pressure from a potable water tap. In contrast, 86% of the epoxy still remained on the glass slides that had been immersed in distilled water and then rinsed with a moderate velocity water jet spray.

Stainless steel slides were coated with an acrylic water-based paint and air-dried for ten hours. A full 100% of this mass was removed within 15 minutes of immersion in a 3% hydrogen peroxide solution at pH 9.5 that contained $10^{-3}M$ $FeCl_3$. In contrast, when the acrylic-coated slides were immersed in mere distilled water, a full 20 minutes immersion time was required to remove 100% of the acrylic paint mass.

Stainless steel slides were coated with alkyd oil-based paint and air-dried for 5 minutes. For samples that were then soaked in a 3% hydrogen peroxide solution at pH 9.5 with $10^{-3}$M FeCl$_3$, only 12% of the paint mass remained following 60 minutes of immersion, plus rinsing with a moderate velocity water jet spray that was created by means of the pressure from a potable water tap. More paint removal could be expected following longer immersion times or more intense water velocity, in accordance with the findings in Example 1. In contrast, samples immersed in distilled water still retained 68% of their original mass following 60 minutes of immersion and moderate velocity water jet spraying that was created by means of the pressure from a potable water tap.

EXAMPLE 7

Dyes

To test the effectiveness of hydrogen peroxide for removing dyes, Congo Red was coated on clean glass slides and then baked at 105° C. for 24 hours. This was followed by soaking in either distilled water, or 3% hydrogen peroxide plus $10^{-3}$M FeCl$_3$ at a pH of 9.5. After a mere 30 seconds exposure to the hydrogen peroxide solution, 0% of the dye remained on the slide surfaces. This compared to 15 minutes required to remove all of the Congo Red with distilled water.

Gram Crystal Violet was coated on glass slides and baked for 24 hours at 105° C. Complete removal was achieved after 45 minutes of immersion in 3% hydrogen peroxide solution at pH 9.5 that contained $10^{-3}$M FeCl$_3$. When similarly coated slides were soaked in distilled water alone, 31% remained after 60 minutes.

Clean slides were coated with Acid Blue 40 and baked for 24 hours at 105° C. Within 30 seconds, 0% of the dye remained on the slides that had been immersed in 3% hydrogen peroxide solution that contained $10^{-3}$M FeCl$_3$ at pH of 9.5. This compared to a 10 minute immersion time required to remove all of the dye when the slides were immersed in distilled water.

EXAMPLE 8

Rubber Cement

Rubber Cement was coated on clean glass slides and air dried for 5 minutes. Slides soaked in a solution of 3% hydrogen peroxide and $10^{-3}$M FeCl$_3$ at pH 9.5 experienced 100% removal (i.e. 0% remaining) after 45 minutes. This compared to slides immersed in distilled water, for which 26% of the rubber cement mass remained after 60 minutes of immersion.

Stainless steel slides were coated with rubber cement and allowed to dry for 5 minutes. Those samples that were then immersed in distilled water retained 83% of their original rubber cement mass after 60 minutes of immersion. In contrast, samples that were immersed in a 3% hydrogen peroxide solution at pH 9.5 which contained $10^{-3}$M FeCl$_3$ retained only 10% of their rubber cement mass following 60 minutes of immersion. Less retention would be expected following longer durations, in accordance with the results in Example 1.

EXAMPLE 9

Glue

Elmers glue™ was coated onto stainless steel slides and allowed to air-dry for 5 minutes. Samples that were then immersed in 3% hydrogen peroxide with $10^{-3}$M FeCl$_3$ at pH 9.5 experienced 100% mass removal within 15 minutes of immersion. In contrast, with mere distilled water, 30 minutes of immersion was required to remove 100% of the glue.

In summary, hydrogen peroxide effectively removed organic residues from glass and stainless steel surfaces. Best results occurred with non-stabilized 3% HOOH that either was maintained at pH values above 7.0 or that contained an FeCl$_3$ catalyst. It is proposed that this cleaning procedure could replace organic solvents that have been characterized as hazardous or toxic.

Thus is described our invention and the manner and process of making and using it in such clear, concise, and exact terms so as to enable any person skilled in the art to which it pertains, or with which it is most nearly connected, to make and use the same.

What is claimed is:

1. A method for the removal of organic residues from a surface of industrial equipment or components thereof comprising the step of contacting said industrial equipment or components with an aqueous peroxide-iron solution for a period of time sufficient to remove said organic residues, wherein said solution has an iron concentration above $1\times10^{-4}$M.

2. A method according to claim 1 wherein forms of said organic residues include asphalt tar, industrial tar, grease, food grease, industrial grease, paint, pharmaceutical residues, polysaccharides, phospholipids, xanthan gum, organic dyes, biological fermentation products, aliphatic material, aromatic material, viscous material, solid material, sorbed material, biological sludges, biological residues, latex paint, acrylic paint, alkyd paint, epoxy paint, glue, rubber cement, or oil.

3. A method as claimed in claim 1, wherein said iron concentration is at least $1\times10^{-3}$M.

4. A method as claimed in claim 3, wherein said iron is an Fe$^{+2}$ salt.

5. A method as claimed in claim 4, wherein said iron is FeCl$_2$.

6. A method as claimed in claim 3, wherein said iron is an Fe$^{+3}$ salt.

7. A method as claimed in claim 6, wherein said iron is FeCl$_3$.

8. A method as claimed in claim 1, wherein said peroxide is at a concentration of 0.2 to 50% by weight.

9. A method as claimed in claim 8, wherein said peroxide-iron solution is at a temperature from 0° to 100° C.

10. A method as claimed in claim 8, wherein said peroxide is at a pH of 2 to 12.5.

11. A method as claimed in claim 1, wherein said surface is stainless steel.

12. A method as claimed in claim 1, further including the step of contacting said surface with an aqueous-based alkaline solution.

13. A method as claimed in claim 1, further including the step of contacting said surface with an aqueous-based acidic solution.

14. A method as claimed in claim 1, wherein said peroxide-iron solution further includes surfactants prior to contacting said surface.

15. A method as claimed in claim 1, further including the presence of a magnet during the step of contacting said surface with the peroxide-iron solution to lessen the effect of radical scavenging stabilizers.

16. A method as claimed in claim 15, wherein said radical scavenging stabilizers is a phosphate.

17. A method as claimed in claim 15, wherein said radical scavenging stabilizers is a phosphate.

18. A method as claimed in claim 1, wherein said iron in said peroxide-iron solution is rust from an oxidized metal.

19. A method as claimed in claim 1, further including the step of contacting said peroxide-iron solution with an ultra violet light during the step of contacting said surface with the peroxide-iron solution.

20. A method as claimed in claim 1, further including the presence of a positively charged solid during the step of contacting said surface with the peroxide-iron solution to lessen the effect of radical scavenging stabilizers.

* * * * *